United States Patent
Tanaka et al.

(10) Patent No.: US 6,906,702 B1
(45) Date of Patent: Jun. 14, 2005

(54) COORDINATE INPUT DEVICE AND ITS CONTROL METHOD, AND COMPUTER READABLE MEMORY

(75) Inventors: Atsushi Tanaka, Yamato (JP);
Masahide Hasegawa, Yokohama (JP);
Kiwamu Kobayashi, Yokohama (JP);
Masaaki Kanashiki, Yokohama (JP);
Yuichiro Yoshimura, Kamakura (JP);
Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,463

(22) Filed: Mar. 16, 2000

(30) Foreign Application Priority Data

Mar. 19, 1999 (JP) ............................................ 11-076862

(51) Int. Cl.⁷ ........................... G09G 5/00; G08C 21/00
(52) U.S. Cl. ................. 345/175; 178/18.01; 178/18.09; 178/19.01
(58) Field of Search ................................ 345/173–179; 178/18.01–18.07, 19.01–19.05, 18.09

(56) References Cited

U.S. PATENT DOCUMENTS

| | | | | |
|---|---|---|---|---|
| 4,717,793 A | * | 1/1988 | Kobayashi | 178/20.02 |
| 4,959,805 A | * | 9/1990 | Ohouchi et al. | 707/5 |
| 5,115,230 A | | 5/1992 | Smoot | 340/707 |
| 5,164,585 A | * | 11/1992 | Lieu | 345/179 |
| 5,248,856 A | * | 9/1993 | Mallicoat | 178/18.01 |
| 5,341,155 A | | 8/1994 | Elrod et al. | 345/179 |
| 5,444,506 A | | 8/1995 | Nakazawa et al. | 353/104 |
| 5,499,098 A | * | 3/1996 | Ogawa | 356/621 |
| 5,502,568 A | * | 3/1996 | Ogawa et al. | 356/620 |
| 5,570,299 A | | 10/1996 | Tokioka et al. | 364/560 |
| 5,570,302 A | | 10/1996 | Kobayashi et al. | 364/561 |
| 5,606,346 A | * | 2/1997 | Kai et al. | 345/173 |
| 5,729,251 A | | 3/1998 | Nakashima | 395/200.2 |
| 5,748,183 A | | 5/1998 | Yoshimura et al. | 345/173 |
| 5,852,434 A | | 12/1998 | Sekendur | 345/179 |
| 6,005,556 A | * | 12/1999 | Kodama | 345/179 |
| 6,208,330 B1 | * | 3/2001 | Hasegawa et al. | 178/18.01 |
| 6,229,601 B1 | | 5/2001 | Hasegawa | 356/141.5 |
| 6,285,359 B1 | | 9/2001 | Ogasawara et al. | 345/175 |
| 6,714,310 B1 | * | 3/2004 | Tanaka et al. | 356/614 |

FOREIGN PATENT DOCUMENTS

| | | |
|---|---|---|
| EP | 0 484 160 | 5/1992 |
| JP | 57-142080 | 9/1982 |
| JP | 4-299727 | 10/1992 |
| JP | 4-371069 | 12/1992 |
| JP | 6-230897 | 8/1994 |
| JP | 6-274266 | 9/1994 |
| JP | 7-76902 | 8/1995 |
| JP | 7-200140 | 8/1995 |
| JP | 2503182 | 3/1996 |
| JP | 9-179685 | 7/1997 |
| JP | 10-334176 | 12/1998 |
| JP | 11-219253 | 8/1999 |

* cited by examiner

Primary Examiner—Vijay Shankar
(74) Attorney, Agent, or Firm—Fitzpatrick, Cella, Harper & Scinto

(57) ABSTRACT

A device has a plurality of linear sensors which are arranged for at least one coordinate axis and detect the beam spot. The levels of detected data are measured by a sensor controller, and the measured levels are compared. Based on the comparison result, the detection result of one of the plurality of linear sensors is selected. A coordinate computation unit outputs a coordinate value corresponding to the beam spot on the basis of the selected detection result. The light-receiving areas of the linear sensors have an overlapping portion.

11 Claims, 17 Drawing Sheets

COORDINATE INPUT DEVICE AND ITS CONTROL METHOD, AND COMPUTER READABLE MEMORY

FIELD OF THE INVENTION

The present invention relates to a coordinate input device for irradiating a predetermined position on a coordinate input screen with light coming from a pointing tool, and generating a coordinate value corresponding to the beam spot, and its control method, and a computer readable memory.

BACKGROUND OF THE INVENTION

As a conventional coordinate input device, a device which senses an image of a beam spot on a screen using a CCD area sensor or linear sensor, and computes and outputs a coordinate value by an image process using a barycentric coordinate position or pattern matching, or the like, a device which uses a position detection element called a PSD (an analog device which can obtain an output voltage corresponding to the spot position), and the like are known.

For example, Japanese Patent Publication No. 7-76902 discloses a device which detects a coordinate position by sensing an image of a beam spot formed by a collimated beam of visible light, and transmitting/receiving control signals by infrared divergent light. Also, Japanese Patent Laid-Open No. 6-274266 discloses a device which detects a coordinate position using a linear CCD sensor and special optical mask.

On the other hand, U.S. Pat. No. 2,503,182 discloses the arrangement of a device using a PSD and a correction method of the output coordinate position.

In recent years, a large-screen display tends to have a larger screen size and higher resolution simultaneously with improvement of brightness. For this reason, the resolving power of a coordinate input device must be improved.

Conventionally, as a coordinate input device of this type, a compact, inexpensive device which uses a ring CCD and is resistant against disturbance light, has been proposed. This coordinate input device has a resolving power $2^N$ times the actual number of pixels by segmenting CCD pixels by computations. For example, to cope with a larger screen, when a CCD having 64 pixels is used and the screen is segmented into 1,024 blocks, a coordinate input device for a large screen can be constructed in principle by simply segmenting one pixel into 16 blocks. However, in such case, although high resolving power can be achieved, the device is vulnerable to the influence of disturbance light or the like other than the input light from the pointing tool.

SUMMARY OF THE INVENTION

The present invention has been made in consideration of the aforementioned problems, and has as its object to provide a coordinate input device which is compatible to a large screen, can attain high resolving power, and can accurately input a coordinate position, its control method, and a computer readable memory.

In order to achieve the above object, a coordinate input device according to the present invention comprises the following arrangement. That is, there is provided a coordinate input device for generating a beam spot by irradiating a predetermined position of a coordinate input surface with light coming from a pointing tool, and generating a coordinate value corresponding to the beam spot, comprising:

a plurality of sensing means, arranged for at least one coordinate axis, for detecting the beam spot;

measurement means for measuring levels of data sensed by the plurality of sensing means;

comparison means for comparing the levels measured by the measurement means;

selection means for selecting a sensing result of one of the plurality of detection means on the basis of a comparison result of the comparison means; and output means for outputting a coordinate value corresponding to the beam spot on the basis of the sensing result selected by the selection means, wherein light-receiving areas of the plurality of sensing means have an overlapping portion.

In order to achieve the above object, a method of controlling a coordinate input device according to the present invention comprises the following arrangement. That is, there is provided a method of controlling a coordinate input device for generating a beam spot by irradiating a predetermined position of a coordinate input surface with light coming from a pointing tool, and generating a coordinate value corresponding to the beam spot, comprising:

a measurement step of measuring levels of data detected by a plurality of sensors, which are arranged for at least one coordinate axis and adapted to sense the beam spot;

a comparison step of comparing the levels measured in the measurement step;

a selection step of selecting a sensing result of one of the plurality of sensors on the basis of a comparison result in the comparison step; and the output step of outputting a coordinate value corresponding to the beam spot on the basis of the sensing result selected in the selection step, wherein light-receiving areas of the plurality of sensors have an overlapping portion.

In order to achieve the above object, a computer readable memory according to the present invention comprises the following arrangement. That is, there is provided a computer readable memory which stores a program code of controlling a coordinate input device for generating a beam spot by irradiating a predetermined position of a coordinate input surface with light coming from a pointing tool, and generating a coordinate value corresponding to the beam spot, comprising:

a program code of a measurement step of measuring levels of data detected by a plurality of sensor, which are arranged for at least one coordinate axis and adapted to sense the beam spot;

a program code of a comparison step of comparing the levels measured in the measurement step;

a program code of a selection step of selecting a sensing result of one of the plurality of sensors on the basis of a comparison result in the comparison step; and a program code of the output step of outputting a coordinate value corresponding to the beam spot on the basis of the sensing result selected in the selection step, wherein light-receiving areas of the plurality of sensors have an overlapping portion.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will be described in detail hereinafter with reference to the accompanying drawings.

A schematic arrangement of an optical coordinate input device according to the present invention will be explained first using FIG. 1.

Figure 1:
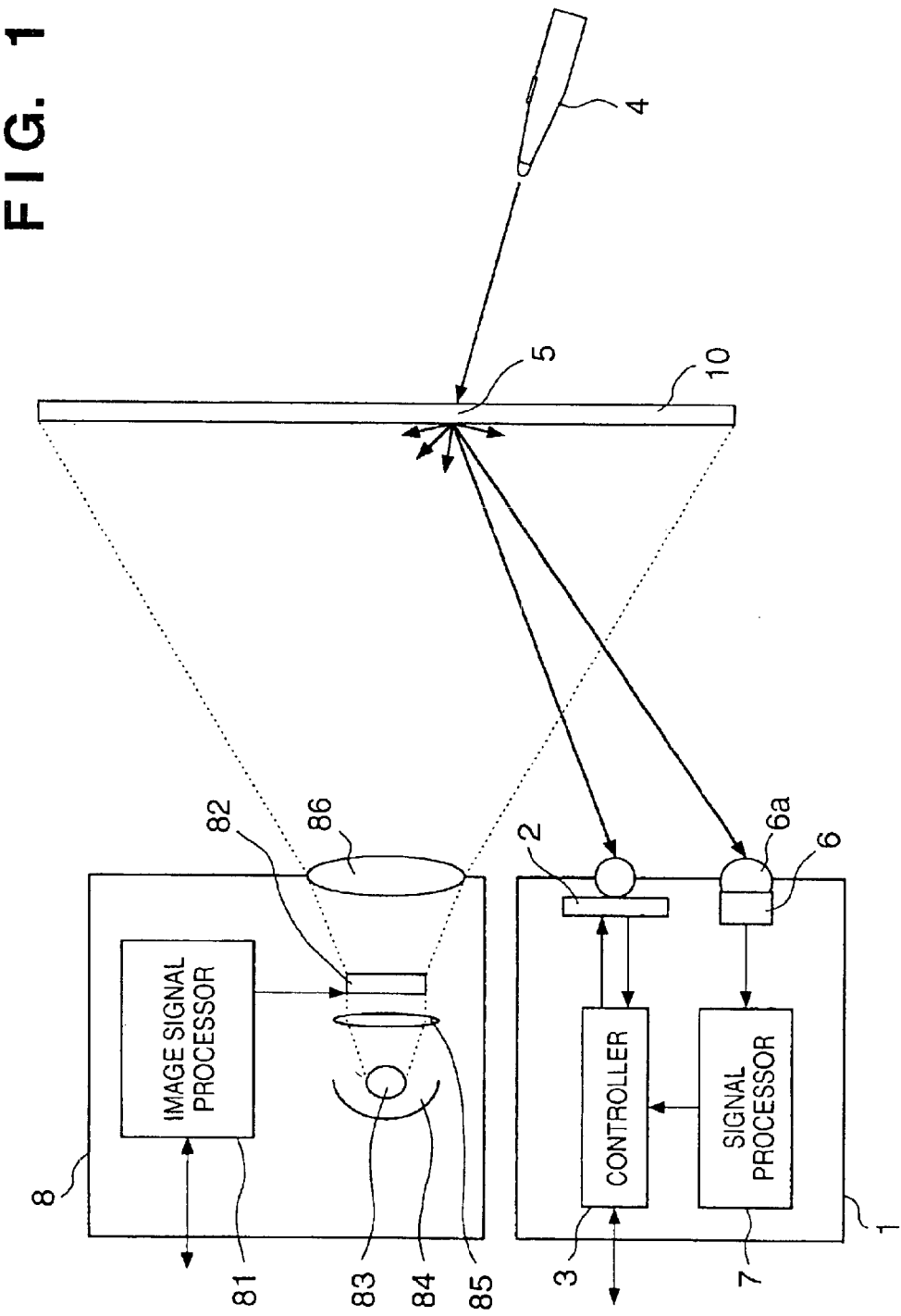
FIG. 1 is a schematic view showing the arrangement of a coordinate input device according to an embodiment of the present invention.

FIG. 1 shows a schematic arrangement of a coordinate input device of this embodiment.

The coordinate input device of this embodiment is roughly constructed by a pointing tool 4 for forming a beam 5 on a screen 10 as a coordinate input surface, and a coordinate detector 1 for detecting the coordinate position and the like of the beam spot 5 on the screen 10. FIG. 1 also shows a projection display device 8 for displaying an image or the coordinate position or the like on the screen 10 as an output device, together with the arrangements of those components.

The coordinate detector 1 comprises a coordinate detection sensor unit 2, a controller 3 for controlling the coordinate detection sensor unit 2, and making coordinate operations and the like, a light-receiving element 6, and a signal processor 7. By detecting the coordinate position of the beam spot 5 on the screen 10, and a control signal corresponding to the states of individual switches (to be described later) of the pointing tool 4, the controller 3 sends that information to an externally connected device (not shown).

The projection display device 8 comprises an image signal processor 81 which receives an image signal from a display signal source as an externally connected device such as a host computer (not shown) or the like, a liquid crystal panel 82 controlled by the image signal processor 81, an illumination optical system including a lamp 83, mirror 84, and condenser lens 85, and a projection lens 86 for projecting an image formed by the liquid crystal panel 82 onto the screen 10, and can display desired image information on the screen 10. Since the screen 10 has appropriate light diffusion characteristics to broaden the observation range of the projected image, a light beam emitted by the pointing tool 4 is diffused at the position of the beam spot 5, and some light components of the light diffused at the position of the beam spot 5 enter the coordinate detector 1 irrespective of the position on the screen or the direction of the light beam.

With this arrangement, the operator inputs character information or line image information using the pointing tool 4 on the screen 10, and displays the input information by the projection display device 8, thus inputting/outputting information like when he or she uses "paper & pencil", and also freely allowing button operations and input operations for, e.g., selecting and determining icons.

Detailed Description of Pointing Tool 4

Figure 2:
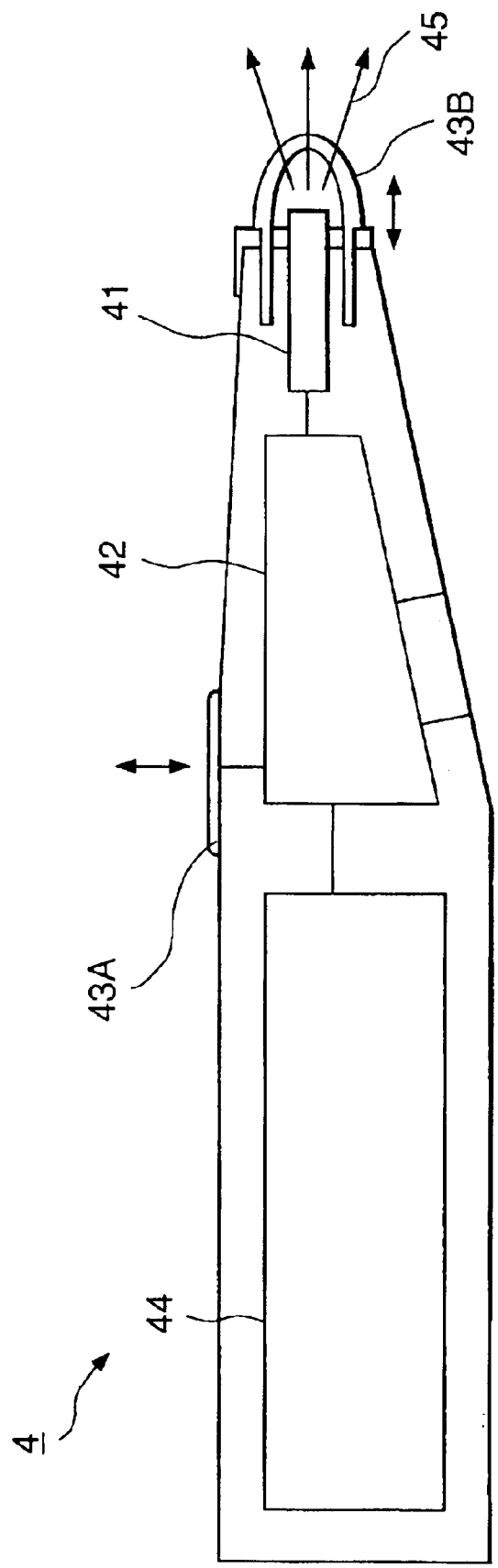
FIG. 2 is a view showing the arrangement of a pointing tool of the embodiment shown in FIG. 1 in detail.

FIG. 2 shows the arrangement of the pointing tool of this embodiment in detail.

The pointing tool 4 incorporates a light-emitting element 41 such as an LED or the like for emitting infrared light, an emission controller 42 for controlling to drive the light-emitting element 41, a power supply 44, and two operation switches 43A and 43B. The emission controller 42 controls to turn on/off emission in correspondence with the states of the operation switches 43A and 43B, and controls emission by superposing a control signal in accordance with a modulation method (to be described later).

The operator holds the pointing tool 4 and directs its distal end toward the screen 10. At this time, infrared light 45 is emitted when the operator holds down the operation switch 43A or presses the operation switch 43B against the screen. In this manner, the beam spot 5 is formed on the screen 10, and a coordinate signal begins to be output by a predetermined process.

The infrared light 45 contains the presence/absence of modulation, and encoded switch information and pen ID information, the coordinate detector 1 reads these pieces of information, and the controller sends the coordinate value, switch information, and pen ID information to the host computer.

Upon receiving the switch information indicating that, for example, the operation switch 43B is ON, the host computer determines "pen down" and makes the same operation as the left-button operation of a mouse used in a DOS/V machine. Upon using, e.g., a drawing program, a line or the like can be drawn in this state. Also, the operation switch 43A can be used as the right button of the mouse used in the DOS/V machine.

The light-emitting element 41 starts emission once either the operation switch 43A or 43B is turned on, and proceeds with emission for a predetermined period of time after the switch is turned off. In this sate, only the cursor on the screen moves. In this manner, the operator can easily operate by quickly and accurately drawing a character or figure at an arbitrary position on the screen 10, or selecting a button or menu.

The emission time can be determined in consideration of the service life of a battery, and for example, the emission time of several ten seconds can give sufficient use feeling.

In this embodiment, the switch information is superposed on infrared light by two different methods. Especially, since the switch information of the operation switch 43B is updated relatively frequently, it is expressed by the presence/absence of modulation of the infrared light.

The timing chart of infrared light emitted upon operation of the operation switch 43B will be explained below using FIG. 3.

Figure 3:
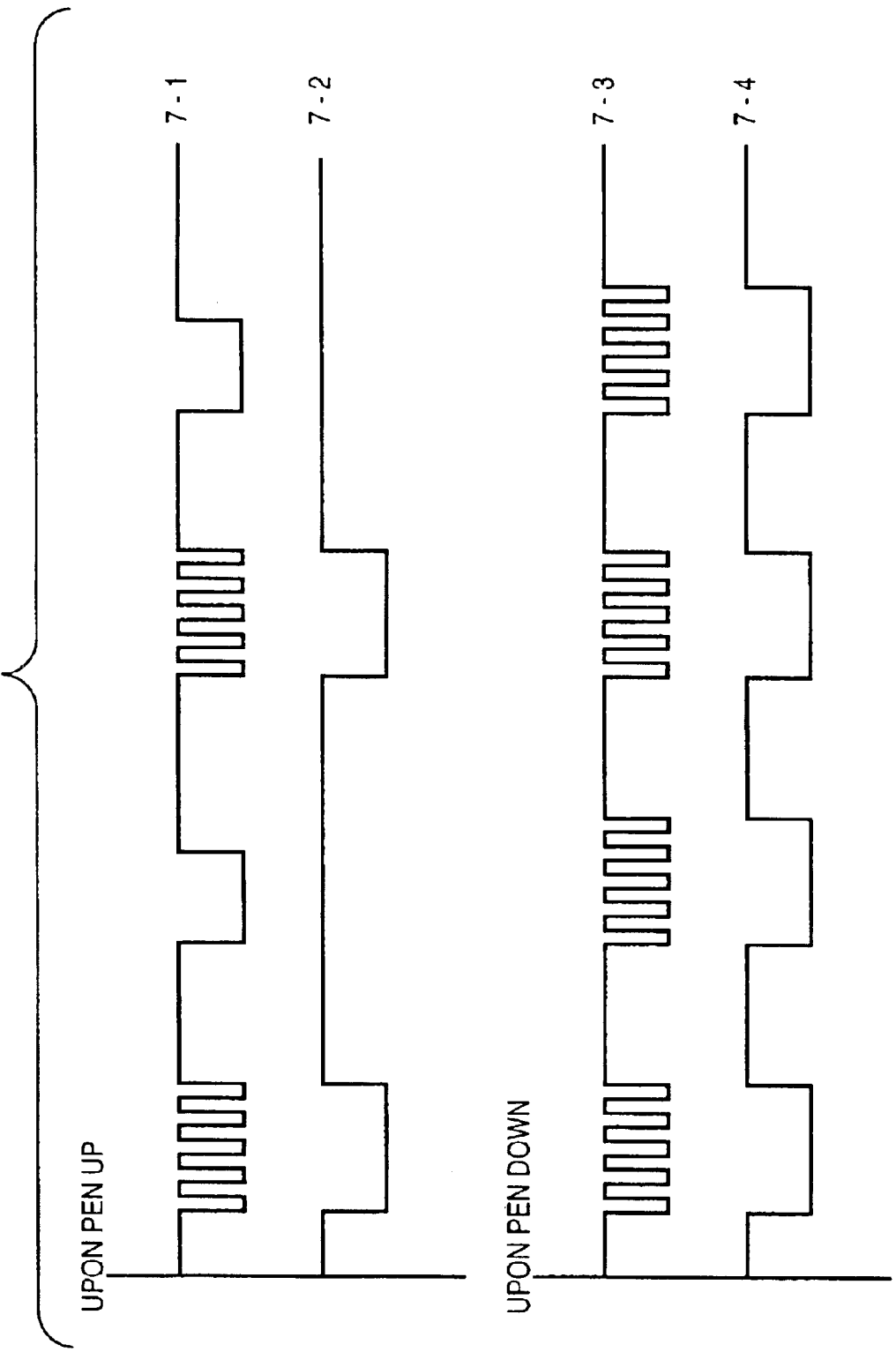
FIG. 3 is a timing chart of infrared light emitted upon operation of an operation switch 43B in the embodiment shown in FIG. 1.

FIG. 3 is a timing chart of infrared light emitted upon operation of the operation switch 43B of this embodiment.

As indicated by 7-1 in FIG. 3, upon "pen up" of the operation switch 43B, modulated light and non-modulated light pulses are alternately emitted. On the other hand, as indicated by 7-3, upon "pen down" of the operation switch 43B, modulated light pulses are always output.

In the coordinate detector 1, the light-receiving element 6 detects the modulated light pulses, and a frequency detecting unit (to be described later) extracts only the modulated light pulses. When the extracted modulated light pulses continuously appear within a predetermined period of time, as indicated by 7-4, "pen down" is determined. On the other hand, when the extracted modulated light pulses are spaced apart, as indicated by 7-2, "pen up" is determined.

The timing chart of infrared light emitted upon operation of the operation switch 43A will be explained below using FIG. 4.

Figure 4:
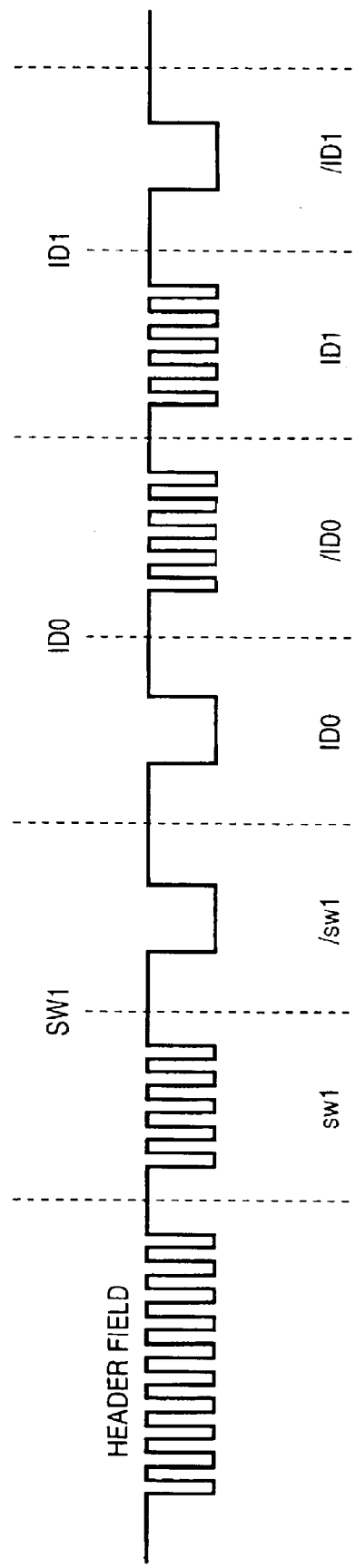
FIG. 4 is a timing chart of infrared light emitted upon operation of an operation switch 43A in the embodiment shown in FIG. 1.

FIG. 4 is a timing chart of infrared light emitted upon operation of the operation switch 43A of this embodiment.

The switch information and pen ID information contained in infrared light emitted upon operation of the operation switch 43A are detected by the coordinate detector 1 by another method. In this method, a header field is assigned in the infrared light, and upon detecting the header field, the ON/OFF state of the operation switch 43A and pen ID information are discriminated on the basis of the pattern of modulated light pulses that follow the header field. In this discrimination, "0" or "1" is expressed by the aforementioned modulated or non-modulated light pulses.

Also, since inverted information of each state (for example, /SW1 for SW1) is sent to be paired with non-inverted information, discrimination errors or the like can be prevented.

In this embodiment, only two operation switches are provided. However, the number of switches is not limited to two, and three or more operation switches may be provided. The roles of the individual operation switches can be re-defined by a driver or the like on the host computer side, and those suitable for the use pattern of the user can be selected.

Detailed Description of Coordinate Detector 1

Figure 5:
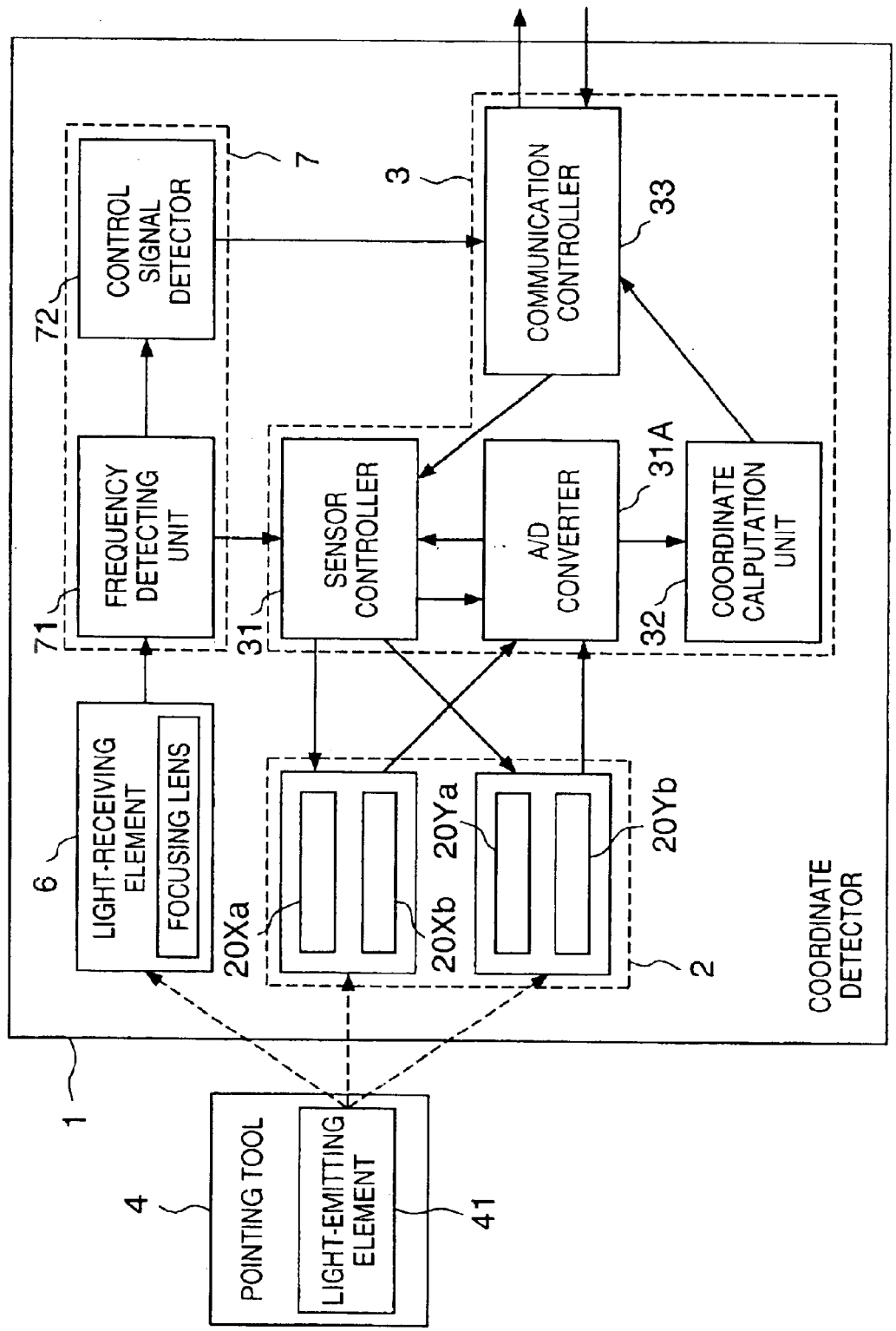
FIG. 5 is a block diagram showing the arrangement of a coordinate detector of the embodiment shown in FIG. 1 in detail.

FIG. 5 shows the detailed arrangement of the coordinate detector of this embodiment.

The coordinate detector 1 has the light-receiving element 6 for detecting the amount of light at high sensitivity by means of a focusing optical system, and four linear sensors 20Xa, 20Xb, 20Ya, and 20Yb for detecting the incoming direction of light by an imaging optical system. These light-receiving element and linear sensors respectively receive diffused light from the beam spot 5 formed on the screen 10 by the light beam coming from the light-emitting element 41 built in the pointing tool 4.

Description of Operation of Focusing Optical System

A focusing lens 6a serving as the focusing optical system is attached to the light-receiving element 6, and detects the amount of light having a predetermined wavelength at high sensitivity from the whole range on the screen 10. This detection output is detected by a frequency detecting unit 71, and is then demodulated by a control signal detector 72 into a digital signal including data such as a control signal (a signal superposed by the emission controller 42 of the pointing tool 4) and the like.

Since this embodiment does not have any means for sending a timing signal such as a cord or the like, the linear sensors 20Xa, 20Xb, 20Ya, and 20Yb are controlled by a modulated signal. As will be described later, signal detection is done based on the difference between signals obtained at the emission and non-emission timings. In order to synchronize that shutter timing with the emission timing, a reset signal for the linear sensors 20Xa, 20Xb, 20Ya, and 20Yb is generated using the timing of the modulated signal.

The timing chart of signals used in the frequency detecting unit 71 will be explained using FIG. 6.

Figure 6:
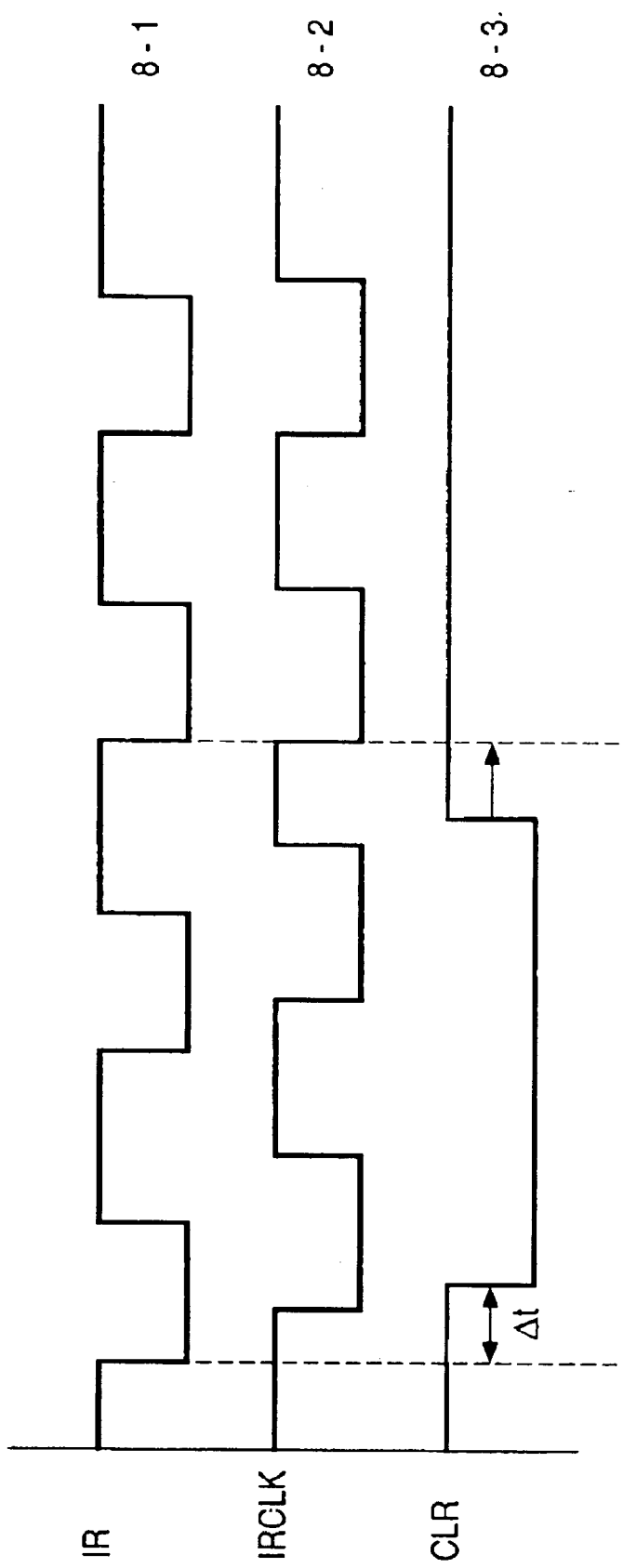
FIG. 6 is a timing chart of signals used in a frequency detecting unit of the embodiment shown in FIG. 1.

FIG. 6 is a timing chart of signals used in the frequency detecting unit 71 of this embodiment.

Figure 8:
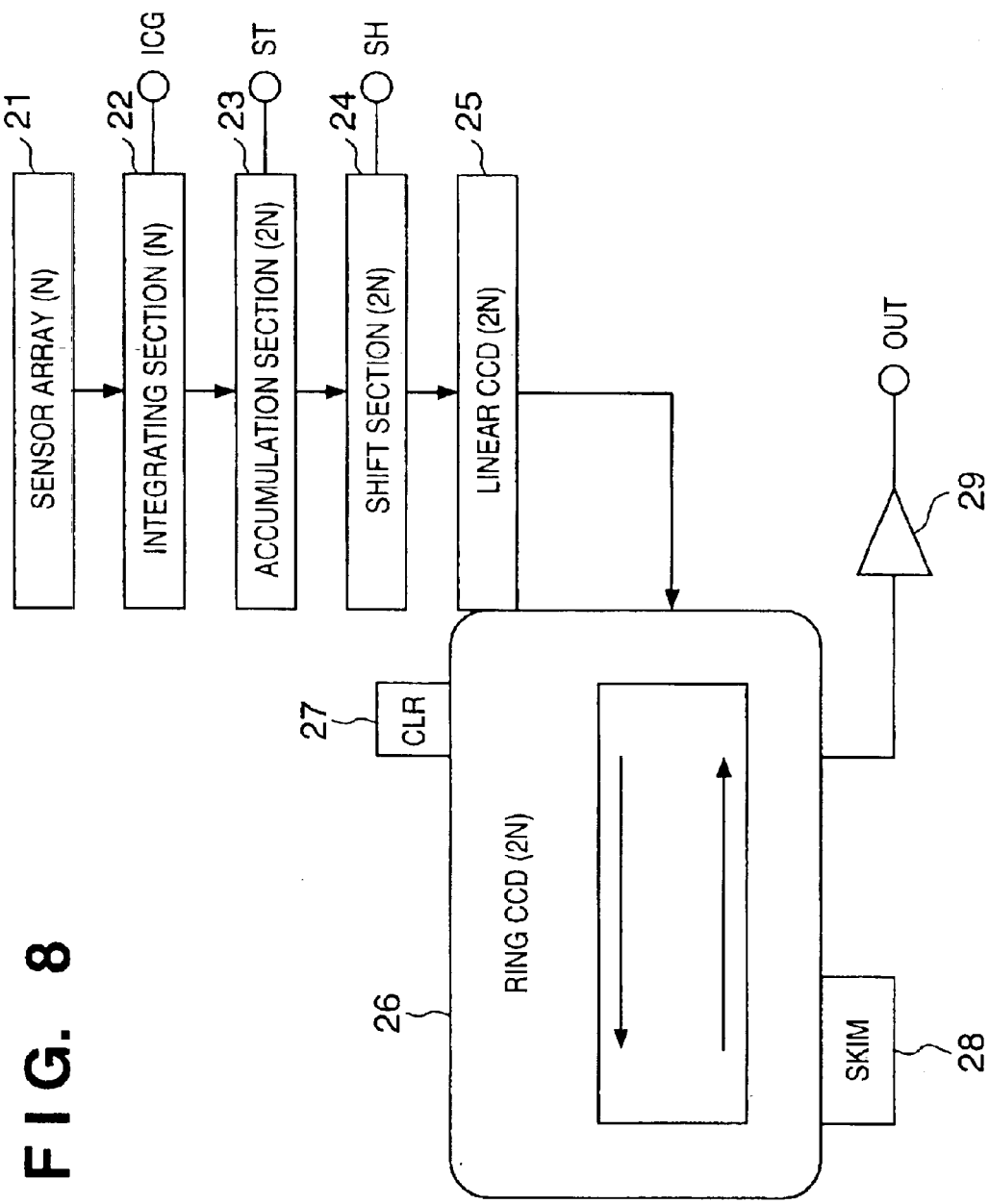
FIG. 8 is a block diagram showing the arrangement of a linear sensor of the embodiment shown in FIG. 1 in detail.

Referring to FIG. 6, 8-1 indicates a signal IR obtained after the modulated signal upon "pen down" is detected by the frequency detecting unit 71. Since this signal IR represents an emission period, the shutter timing of the linear sensors 20Xa, 20Xb, 20Ya, and 20Yb must be synchronized with this signal.

On the other hand, 8-2 indicates a signal IRCLK which represents a shutter period of the linear sensors 20Xa, 20Xb, 20Ya, and 20Yb, and indicates the emission detection signal when it is L (low level) and indicates the non-emission detection timing when it is H (high level). This signal IRCLK is output from the linear sensors 20Xa, 20Xb, 20Ya, and 20Yb on the basis of clocks supplied thereto. In order to synchronize this signal IRCLK with the emission period, a clear (CLR) signal (8-3) is output to the linear sensors 20Xa, 20Xb, 20Ya, and 20Yb a predetermined delay time in which the signals IR and IRCLK can be synchronized after the signal IR indicated by 8-1 is detected.

This clear operation attains synchronization. The delay amount can be determined by the time required until the signal IRCLK goes LOW after the signal CLR ends.

Description of Operation of Imaging Optical System

Figure 7:
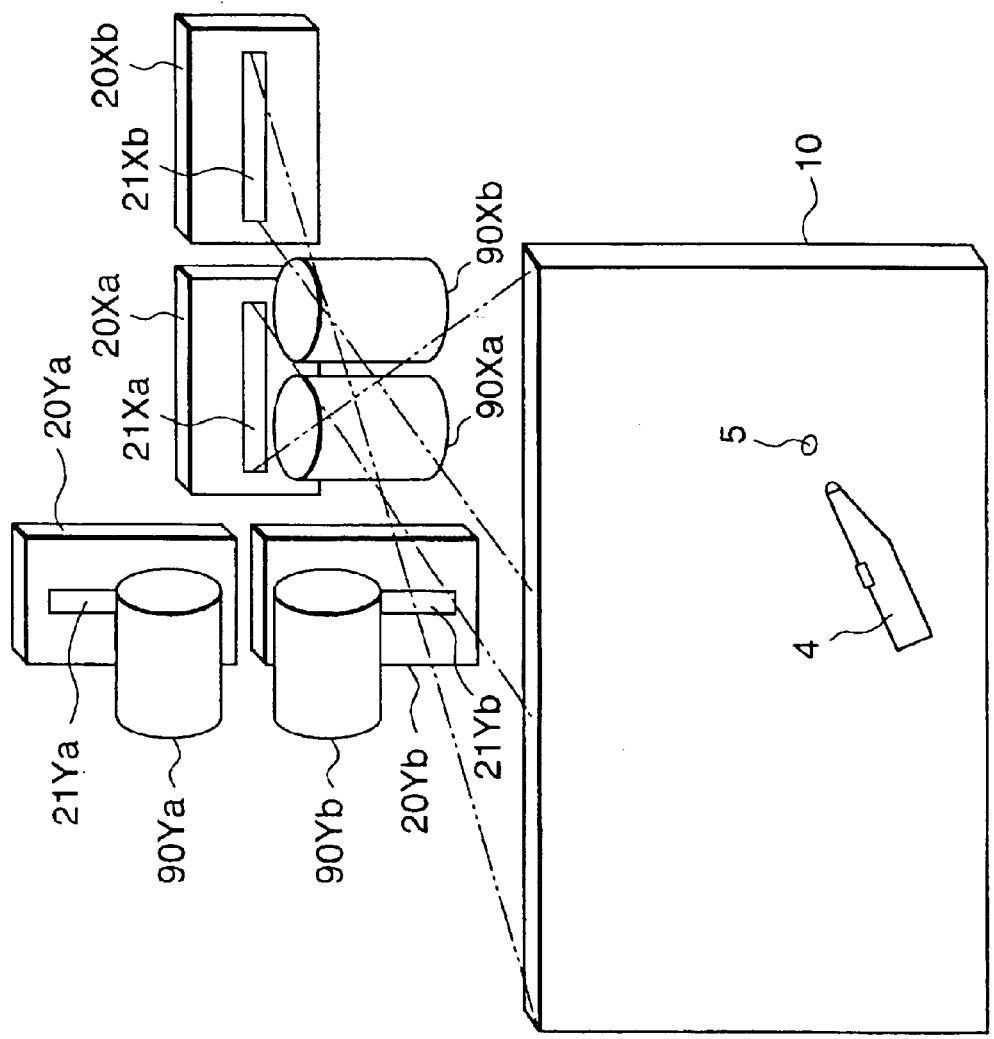
FIG. 7 is a view showing the positional relationship among linear sensors 20Xa, 20Xb, 20Ya, and 20Yb of the embodiment shown in FIG. 1.

FIG. 7 shows the positional relationship of the linear sensors 20Xa, 20Xb, 20Ya, and 20Yb.

Referring to FIG. 7, cylindrical lenses 90Xa, 90Xb, 90Ya, and 90Yb serving as the imaging optical system form images of the beam spot 5 in a linear pattern on photosensitive portions (sensor arrays) 21Xa, 21Xb, 21Ya, and 21Yb of the linear sensors 20Xa, 20Xb, 20Ya, and 20Yb. By laying out these linear sensors 20Xa, 20Xb, 20Ya, and 20Yb to make right angles, outputs having peaks in pixels that reflect X- and Y-coordinates can be obtained.

These linear sensors 20Xa, 20Xb, 20Ya, and 20Yb are controlled by a sensor controller 31, and their output signals are sent to a coordinate computation unit 32 as digital signals converted by an A/D converter 31A connected to the sensor controller 31. The coordinate computation unit 32 computes an output coordinate value based on the input digital signals, and outputs the computation result to an external control device (not shown) via a communication controller 33 by a predetermined communication method together with data such as a control signal and the like from the control signal detector 72. When an operation unlike in a normal state (e.g., setting of a user calibration value) is done upon, e.g., adjustment, the communication controller 33 sends a mode switching signal to the sensor controller 31 and coordinate computation unit 32.

In the present invention, the image of the beam spot 5 is intentionally blurred using focal point adjustment or a diffusion film or the like so that it has an image width several times that of the pixels of each of the linear sensors 20Xa, 20Xb, 20Ya, and 20Yb. However, if the image is blurred too much, since the peak level lowers, the image width of about several pixels is optimal. One characteristic feature of the present invention is that the linear sensors 20Xa, 20Xb, 20Ya, and 20Yb each having a CCD with a small number of pixels, and an appropriately blurred optical system are used. Using such combination, a coordinate input device which can reduce the computation data volume, and can assure very high resolving power, precision, and operation speed, and low cost using the compact sensors and optical system can be realized.

The X-coordinate detection linear sensors 20Xa and 20Xb having CCD arrays have the same arrangement as that of the Y-coordinate detection linear sensors 20Ya and 20Yb, and their detailed arrangement will be explained below using FIG. 8.

FIG. 8 shows the detailed arrangement of the linear sensor of this embodiment.

A sensor array 21 serving as a light-receiving portion consists of N pixels (64 pixels in this embodiment), and stores a charge corresponding to the received light amount in an integrating section 22. The integrating portion 22 consists of N blocks, and can be reset by applying a voltage to a gate ICG, thus allowing an electronic shutter operation. The charge stored in this integrating section 22 is transferred to an accumulation section 23 by applying a pulse voltage to an electrode ST. The accumulation section 23 consists of 2N blocks, which individually accumulate charges in correspondence with H (high level) and L (low level) of the signal IRCLK synchronous with the emission timing of the pointing tool 4. After that, the charges individually accumulated in synchronism with the ON and OFF timings of light are transferred to a linear CCD section 25 consisting of 2N blocks via a shift section 24 which consists of 2N blocks and facilitates transfer clocks.

In this manner, the linear CCD section 25 stores, in a line, pairs of charges of the sensor outputs from the N pixels, which correspond to the ON and OFF states of light. The charges stored in a line in the linear CCD section 25 are transferred in turn to a ring CCD section 26 consisting of 2N blocks. The ring CCD 26 is cleared by a CLR section 27 in response to the signal CLR, and sequentially accumulates charges transferred from the linear CCD section 25.

The charges accumulated in this manner are read by an amplifier 29. The amplifier 29 outputs a voltage proportional to the accumulated charge amount in a nondestructive manner. In practice, the amplifier 29 amplifies and outputs a difference between neighboring charge amounts, i.e., a value obtained by subtracting a charge amount obtained at the OFF timing of the light-emitting element 41 from that at the ON timing.

An example of the output waveforms of the linear sensors 20Xa, 20Xb, 20Ya, and 20Yb obtained at that time will be explained below using FIG. 9.

Figure 9:
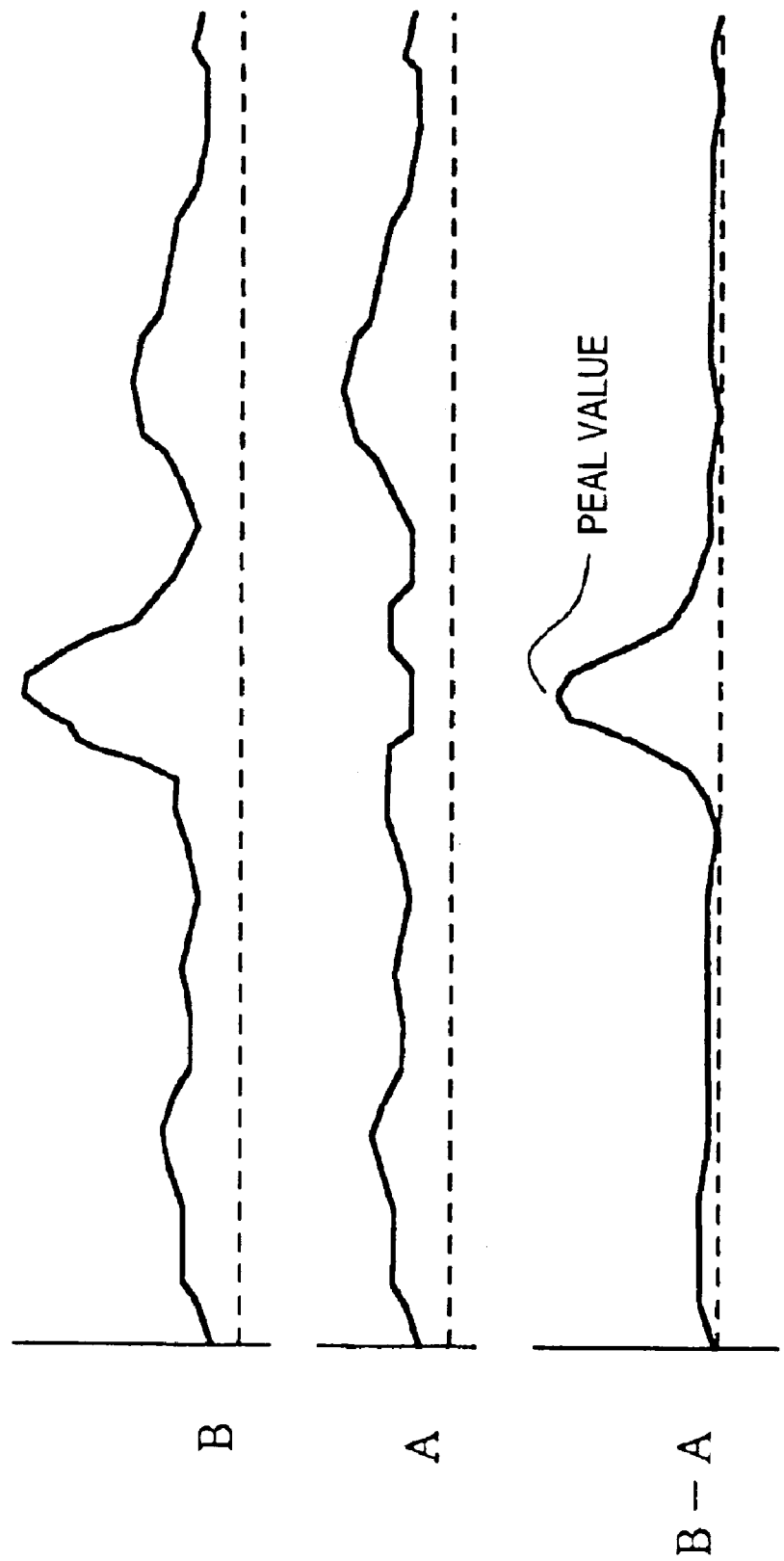
FIG. 9 is a waveform chart showing an example of the output waveforms of the linear sensors of the embodiment shown in FIG. 1.

FIG. 9 shows an example of the output waveforms of the linear sensors of this embodiment.

In FIG. 9, a waveform B is formed by reading only signals at the ON timing of the light-emitting element 41, and a waveform A is obtained at the OFF timing, i.e., formed by only disturbance light (as shown in FIG. 8, the ring CCD 26 stores charges of pixels corresponding to these waveforms A and B at neighboring positions). The amplifier 29 nondestructively amplifies and outputs the difference value (waveform B−A) between the neighboring charge amounts. In this manner, a signal of an image formed by only light coming from the pointing tool 4 can be obtained, and a stable coordinate input can be attained without being influenced by disturbance light (noise).

If the maximum value of the waveform B−A shown in FIG. 9 is defined as a PEAK value, the PEAK value increases with increasing accumulation time in which the linear sensors 20Xa, 20Xb, 20Ya, and 20Yb function with respect to light. In other words, if the time for one period of the signal IRCLK is defined to be a unit accumulation time, and the number n of times of accumulation is defined using that time as a unit, the PEAK value increases with increasing number n of times of accumulation. By detecting if the PEAK value reaches a predetermined value TH1, an output waveform having given quality can always be obtained.

Figure 10:
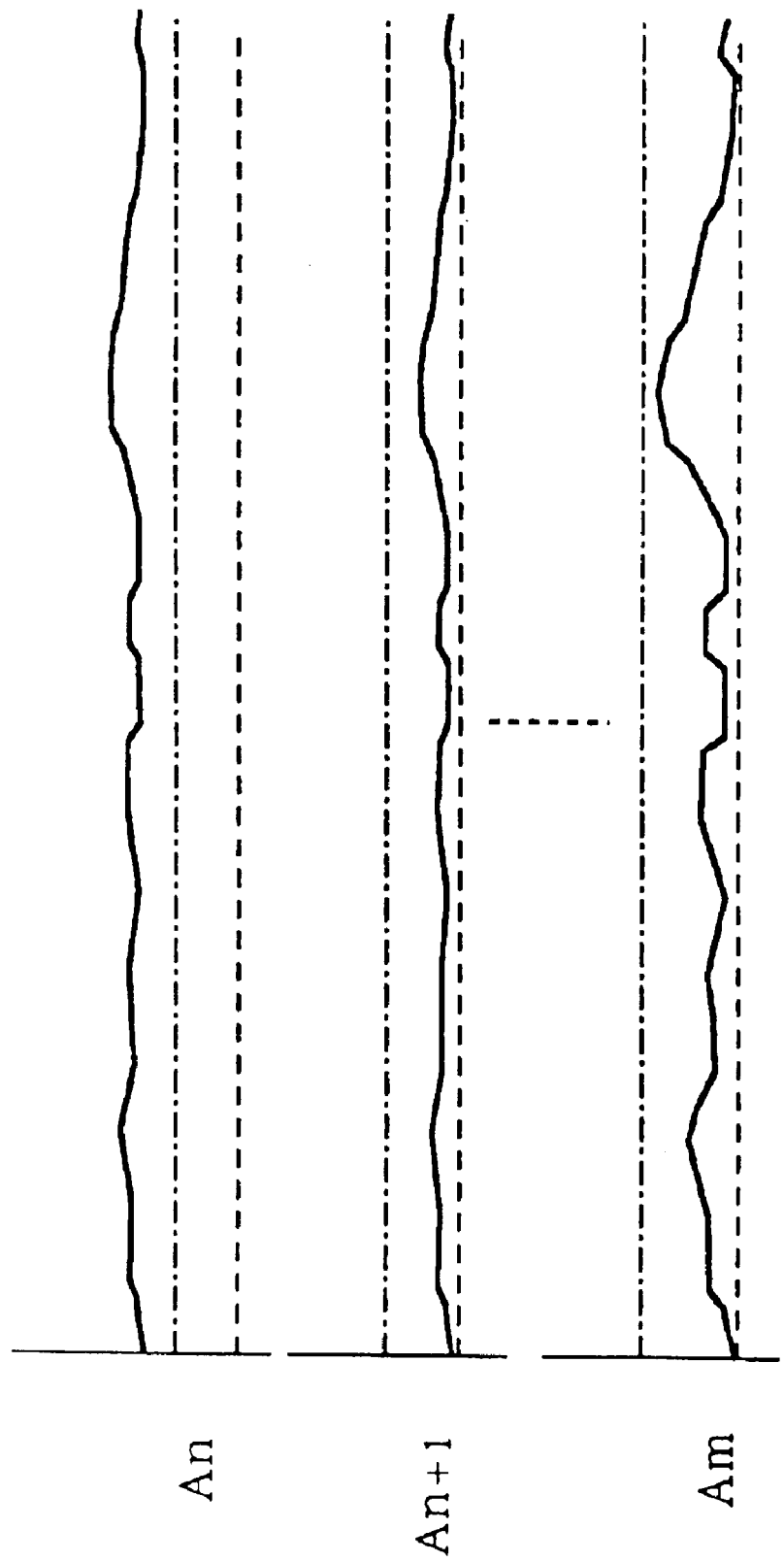
FIG. 10 is a waveform chart showing an example of the output waveforms to explain the skim operation of the linear sensors of the embodiment shown in FIG. 1.

On the other hand, when disturbance light is very intense, the transferred charges of the ring CCD 26 may be saturated before the peak of the differential waveform B−A reaches a sufficient value. In consideration of such case, each of the linear sensors 20Xa, 20Xb, 20Ya, and 20Yb has a SKIM section 28 having a skim function. The SKIM section 28 monitors the level of a non-emission signal, and in FIG. 10 when the signal level has exceeded a predetermined value in a waveform An obtained by n-th accumulation (one-dashed chain curve in FIG. 10), the SKIM section 28 skims a predetermined amount of charges from pixels corresponding to the waveforms A and B. In this manner, a waveform An+1 is obtained by the next (n+1)-th accumulation, and by repeating this process, accumulation of the signal charges can proceed without being saturated even under very intense disturbance light.

Therefore, even when the amount of flickering light coming from the pointing tool 4 is very small, a signal waveform having a sufficiently large magnitude can be obtained by repeating integrating operations a large number of times. Especially, when the pointing tool 4 uses a light-emitting source of the visible light range, since a signal of a display image is superposed, a sharp waveform which suffers little noise can be obtained using the aforementioned skim function and differential output.

The timing chart in the output control of the ring CCD 26 will be described below with reference to FIG. 11.

Figure 11:
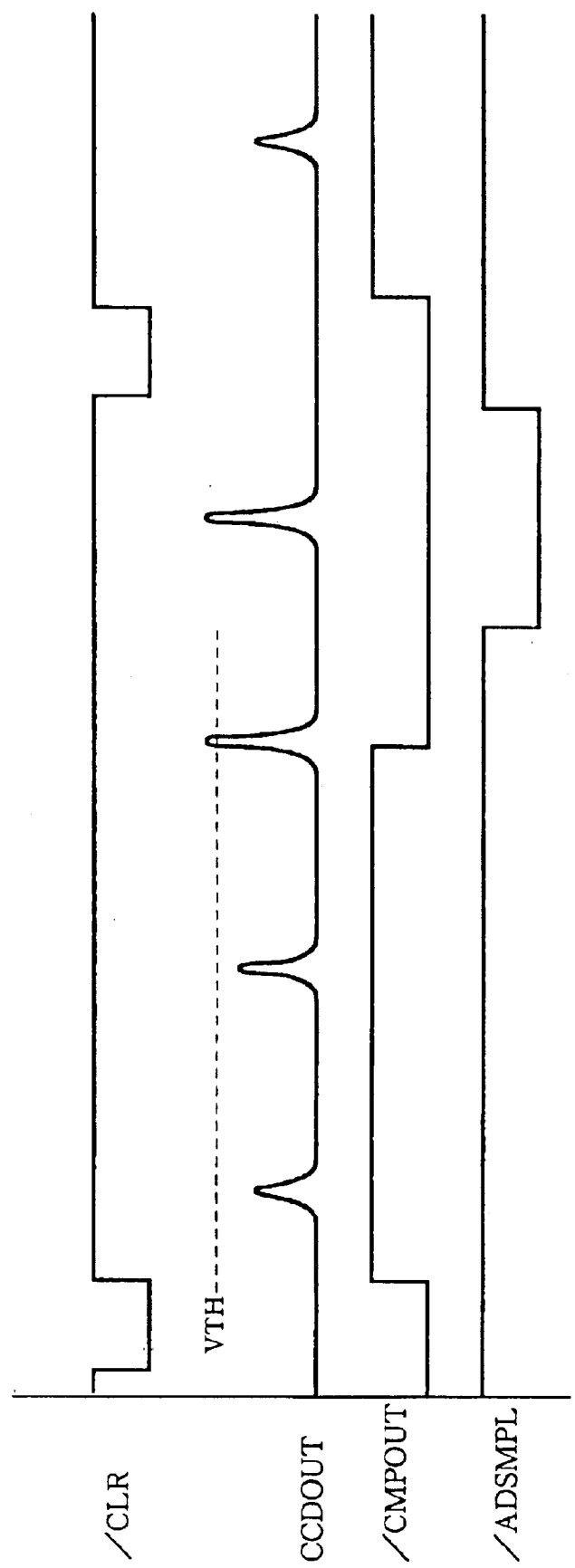
FIG. 11 is a timing chart in the output control of a ring CCD of the embodiment shown in FIG. 1.

FIG. 11 is a timing chart in the output control of the ring CCD of this embodiment.

All operations are cleared by the signal CLR a predetermined delay time after the signal IR. If an input is made by the pointing tool 4, a detection signal such as a signal CCDOUT increases by the integrating operation. When the detection signal has exceeded a predetermined level (VTH), the integrating operation of the ring CCD 26 is stopped in response to the trailing edge of a signal CMPOUT output from a comparator. The sensor controller 31 starts A/D conversion in response to the trailing edge of the signal CMPOUT. The A/D conversion period is set to A/D-convert all pixel outputs from the ring CCD 26, as indicated by a signal ADSMPL.

As described above, when the output from the ring CCD 26 does not exceed the predetermined level, the sensor controller 31 counts the time elapsed from the clear timing. When a predetermined period of time has elapsed from the clear timing, the controller 31 forcibly starts A/D conversion. In this manner, even when an input is small, sampling can be done within a predetermined sampling period.

Figure 12:
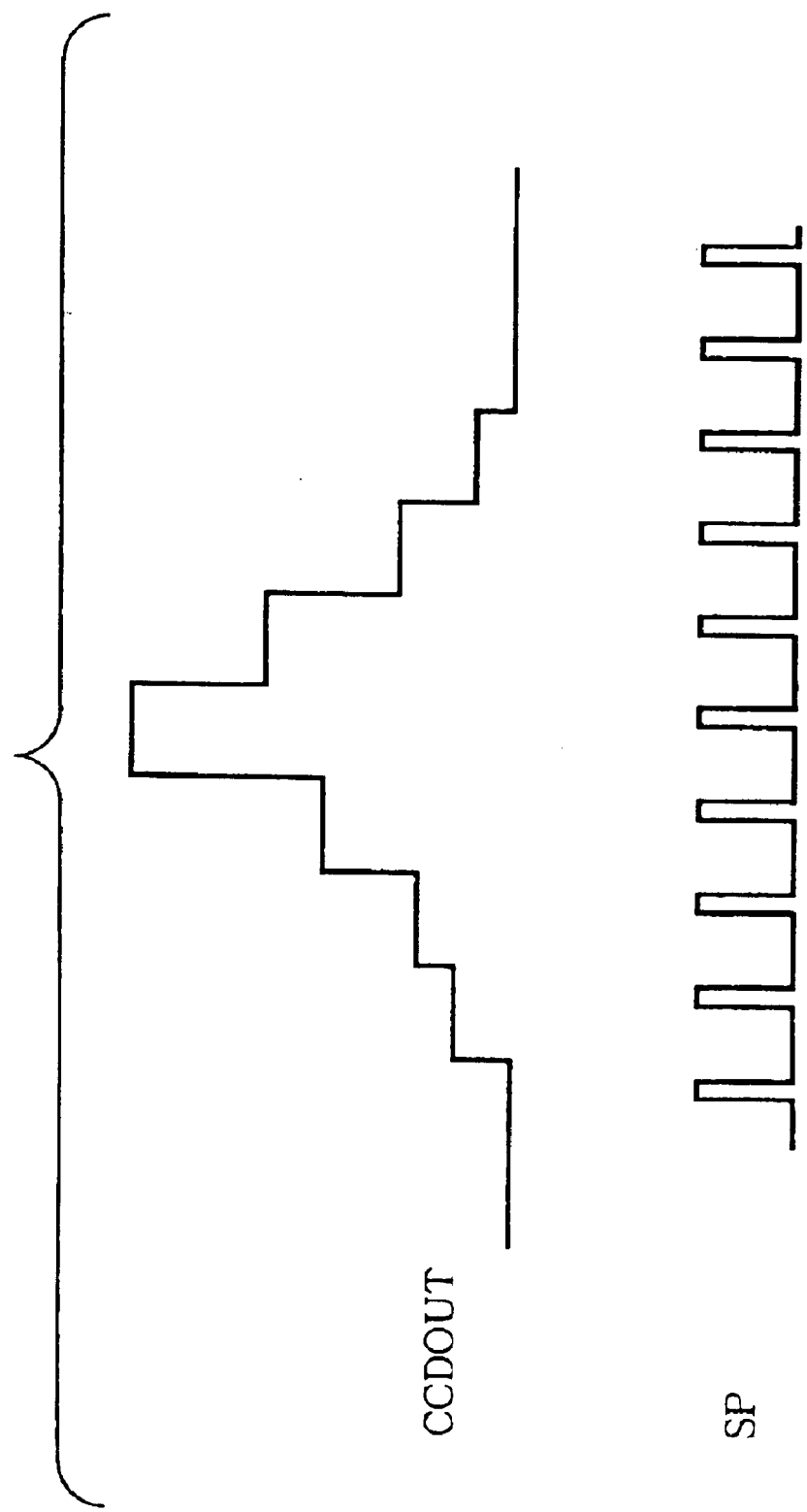
FIG. 12 is a timing chart of A/D conversion of the embodiment shown in FIG. 1.

A/D conversion is done at the timing shown in FIG. 12. The signal CCDOUT as the output from the ring CCD is output as a voltage corresponding to the detected light level in units of pixels, as shown in FIG. 12, when the time axis is illustrated in an enlarged scale. This signal is A/D converted in units of pixels at the timings of sampling pulses SP, and the sensor controller 31 stores that level in a memory or the like.

The aforementioned operations are done for all the ring CCDs 26 corresponding to the respective coordinate axis, and coordinate computations (to be described below) are made.

Light from the pointing tool 4 that reaches the coordinate detector 1 varies as the power supply unit (battery) 44 built in the pointing tool 4 is consumed, and also varies depending on the posture of the pointing tool 4. Especially, when the screen 10 has low light diffusion characteristics, the front luminance of a displayed image improves, but variations of the amount of light input to the coordinate detector 1, that depend on the posture of the pointing tool 4 increase. However, in the present invention, the number of times of integration automatically follows to always obtain a stable output signal even in such case, thus allowing stable coordinate detection.

As described above, since an RF carrier is added to flickering light and the timing of the integrating operation is controlled by a demodulated signal of a predetermined period obtained by frequency-detecting that carrier, a coordinate input device which can cordlessly synchronize the pointing tool and image sensing section and is easy to use can be realized. Also, since an integration control means which monitors the peak level of a differential signal from the integrating section and stops the integrating operation is provided, even when the amount of light has changed, a beam spot image signal having nearly a constant level can be generated and, hence, a stable coordinate computation result with high resolving power can always be obtained.

Coordinate Value Computation

The coordinate computation process in the coordinate computation unit 32 will be described below.

The output signals (differential signals from the amplifiers 29) from the four linear sensors 20*Xa*, 20*Xb*, 20*Ya*, and 20*Yb* obtained as described above are sent to the coordinate computation unit 32 as digital signals converted by the A/D converter 31A connected to the sensor controller 31, and coordinate values are computed. The coordinate values are respectively computed from the outputs in the X- and Y-coordinate directions. Note that the same computation process is done for the X- and Y-coordinates, and only the computation process of the X-coordinate value will be explained.

Figure 13:
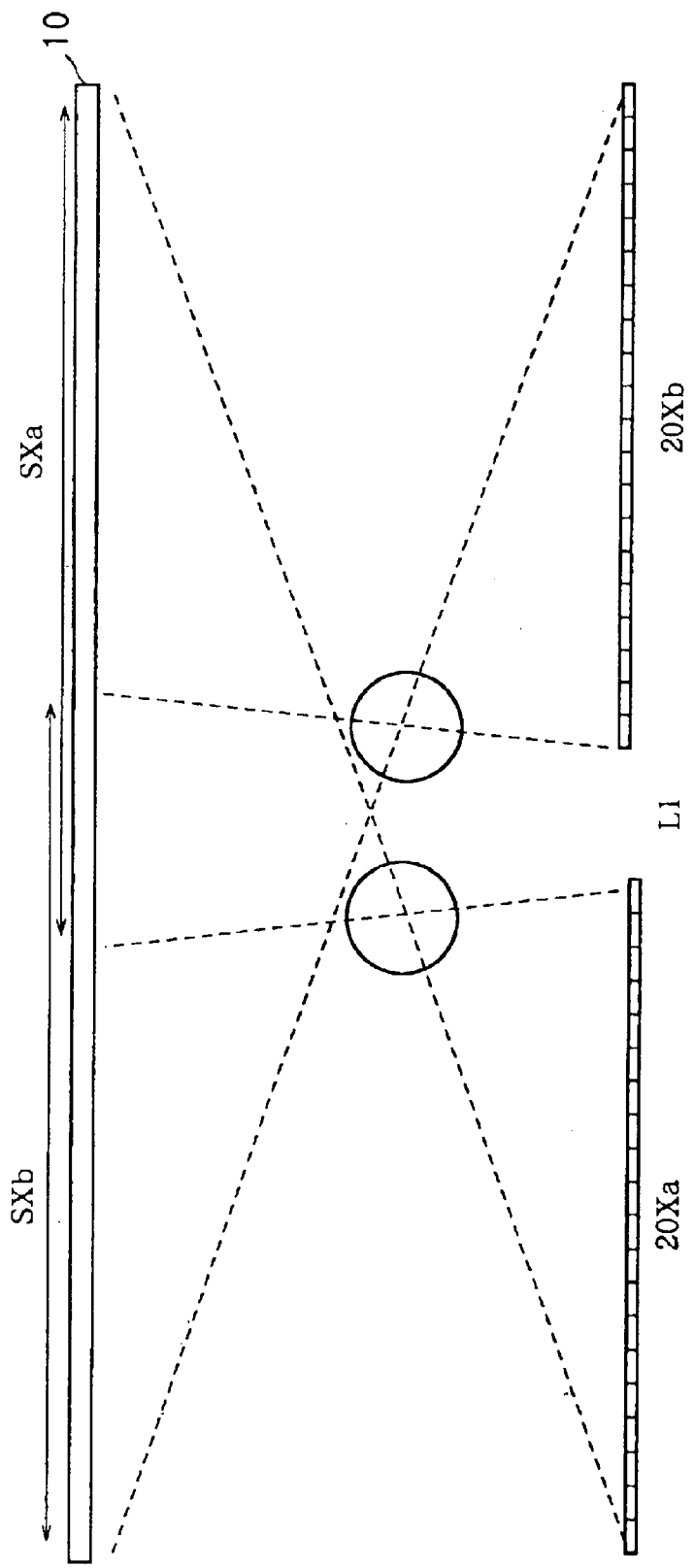
FIG. 13 is a view showing the arrangement of the linear sensors of the embodiment shown in FIG. 1.

The linear sensors 20*Xa* and 20*Xb* are constructed as vertical half detection regions of the screen 10, as shown in FIG. 13, and their detection regions overlap each other near the center of the screen.

The linear sensor 20*Xa* detects light when the beam spot is present within a region SXa of the screen 10, and the linear sensor 20*Xb* detects light when the beam spot is present within a region SXb of the screen 10. In the overlapping region, detection is made by the two sensors. The outputs from the linear sensors 20*Xa* and 20*Xb* at that time will be described below with reference to FIG. 14.

Figure 14:
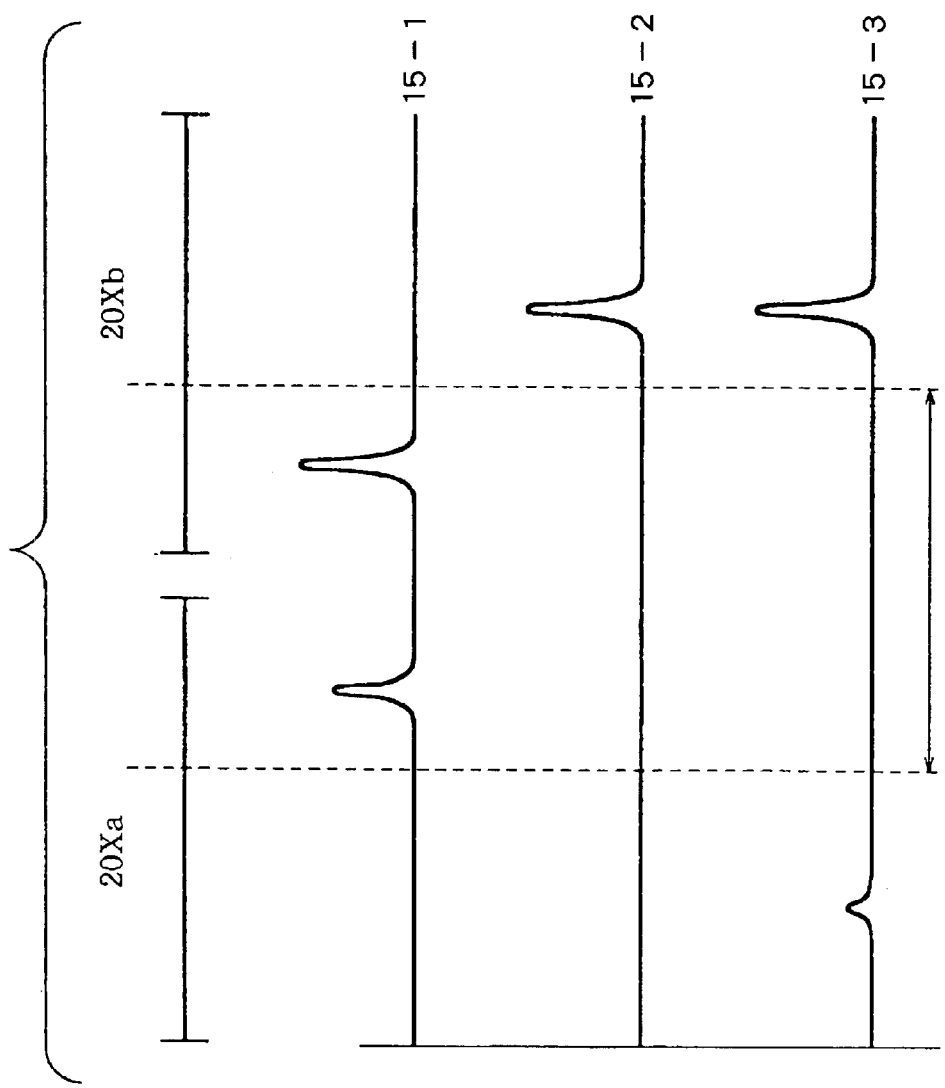
FIG. 14 is a chart illustrating the outputs from the linear sensors.

FIG. 14 illustrates the outputs from the linear sensors.

When the beam spot is located at the central overlapping region, the outputs from both the linear sensors 20*Xa* and 20*Xb* appear, as indicated by 15-1. On the other hand, when the beam spot is located within the region SXb, the output from only the linear sensor 20*Xb* appears, as indicated by 15-2. When only one output ideally appears in a region other than the overlapping region, switching determination is made based on one coordinate value depending on whether or not that value exceeds a reference point, and coordinate values are coupled.

However, an output may be produced at a position other than the original beam spot position, as indicated by 15-3, due to noise, leakage light, disturbance light, or the like.

In such case, if determination is made using only one coordinate value, a wrong determination is made, and a cursor or the like is suddenly displayed on the display screen (for example, during drawing, an unwanted line is drawn). To avoid such problem, in the present invention, coordinate values are determined on the basis of the obtained peak values of the outputs from the linear sensors 20*Xa*, 20*Xb*, 20*Ya*, and 20*Yb*.

The processing flow of the coordinate computation process of this embodiment will be described below with reference to FIG. 15.

Figure 15:
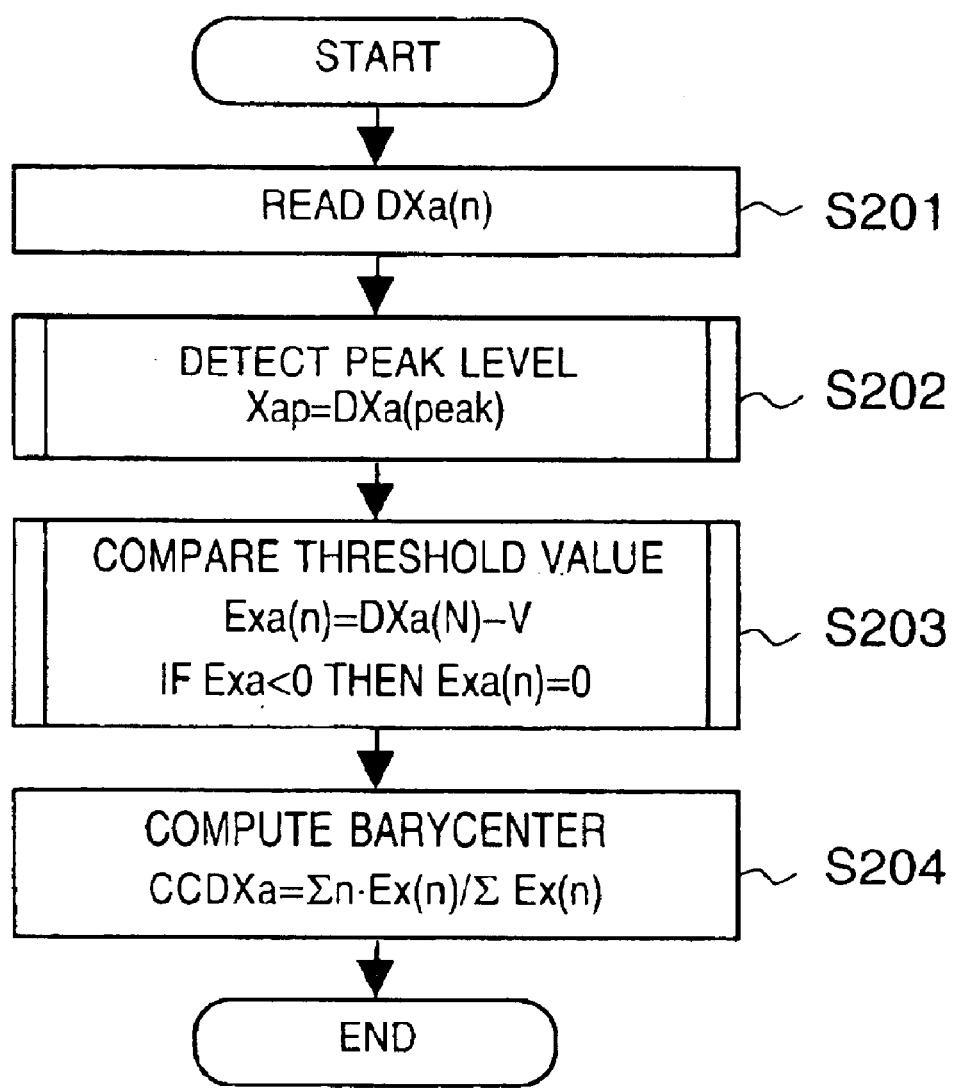
FIG. 15 is a flow chart showing the processing flow of a coordinate computation process of the embodiment shown in FIG. 1.

FIG. 15 is a flow chart showing the processing flow of the coordinate computation process of this embodiment.

Note that DXa and DXb represent the outputs from the ring CCDs 26 of the linear sensors 20*Xa* and 20*Xb*. Since these values are A/D-converted values, as described above, they represent voltage values corresponding to the amounts of detected light in units of pixels of the ring CCDs 26. Hence, a peak level determined by the maximum value of respective data.

Also, CCDXa and CCDXb represent coordinates detected by the linear sensors 20*Xa* and 20*Xb*.

In step S201, differential data DXa(n) (in this embodiment, the number n of pixels=64) as a differential signal of given pixels at an arbitrary coordinate input point is loaded, and is stored in a buffer memory (not shown). In step S202, a peak level of the stored data is obtained, and is stored as XaP. In step S203, the data DXa(n) is compared with a threshold value V set in advance to compute a data value Exa(n) equal to or larger than the threshold value. Using this data value Exa(n), a coordinate CCDXa on the linear sensor 20*Xa* is computed in step S204. In this embodiment, the barycenter of output data is computed by a barycenter method, but the computation method is not particularly limited (for example, a method of obtaining a peak value of output data Exa(n) (by, e.g., a differential method) may be used).

Likewise, a coordinate CCDXb on the linear sensor 20*Xb* is computed.

These computed coordinate values respectively correspond to pixels on the linear CCDs 26 of the linear sensors 20*Xa* and 20*Xb*. For this reason, by coupling these coordinate values, the coupled value can be used as a coordinate value on a single linear sensor (20*Xa*, 20*Xb*).

For this purpose, a reference coordinate for coupling the coordinate values corresponding to pixels on the linear CCDs 26 of the linear sensors 20*Xa* and 20*Xb* is defined.

Figure 16:
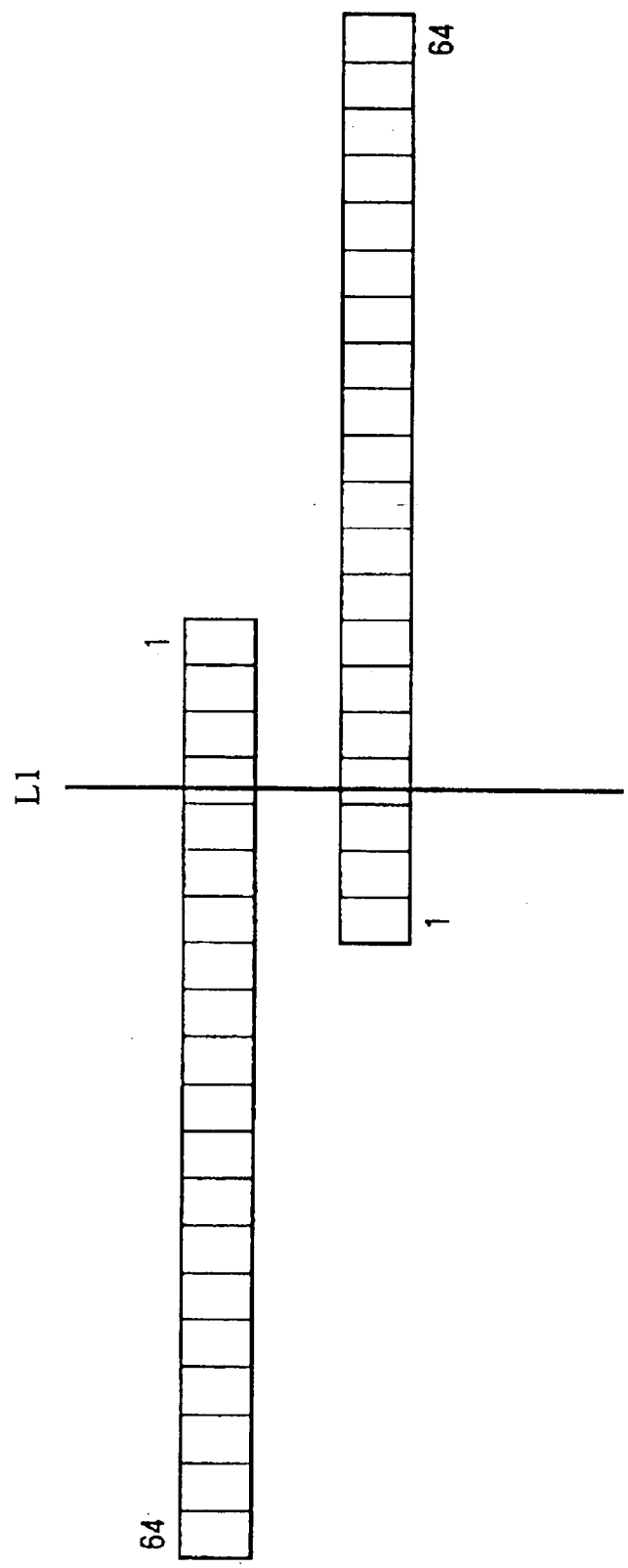
FIG. 16 is a view for explaining definition of a reference coordinate of the embodiment shown in FIG. 1.

Definition of the reference coordinate will be explained below using FIG. 16 FIG. 16 is a view for explaining definition of the reference coordinate in this embodiment.

FIG. 16 illustrates the conceptual layouts of the coordinates of the linear CCDs 26 of the linear sensors 20*Xa* and 20*Xb*. Since the detection regions of the linear sensors 20*Xa* and 20*Xb* have an overlapping portion, as described above, their coordinate positions overlap each other, as shown in FIG. 16.

At this time, a reference point is defined in advance in a region where both the linear CCDs 26 of the linear sensors 20Xa and 20Xb can measure. That is, an input is made on the overlapping portion on the screen 10, and is read as coordinates CCDXa and CCDXb (CCDXa_org and CCDXb_org). These values are stored in a nonvolatile memory (not shown) such as an EEPROM as reference point data (reference coordinate), and coordinate computations are made by reading out the values in a normal use state.

The process for computing a coupled coordinate CCDX obtained by coupling the coordinate values corresponding to pixels on the linear CCDs 26 of the linear sensors 20Xa and 20Xb will be described below with reference to FIG. 17.

Figure 17:
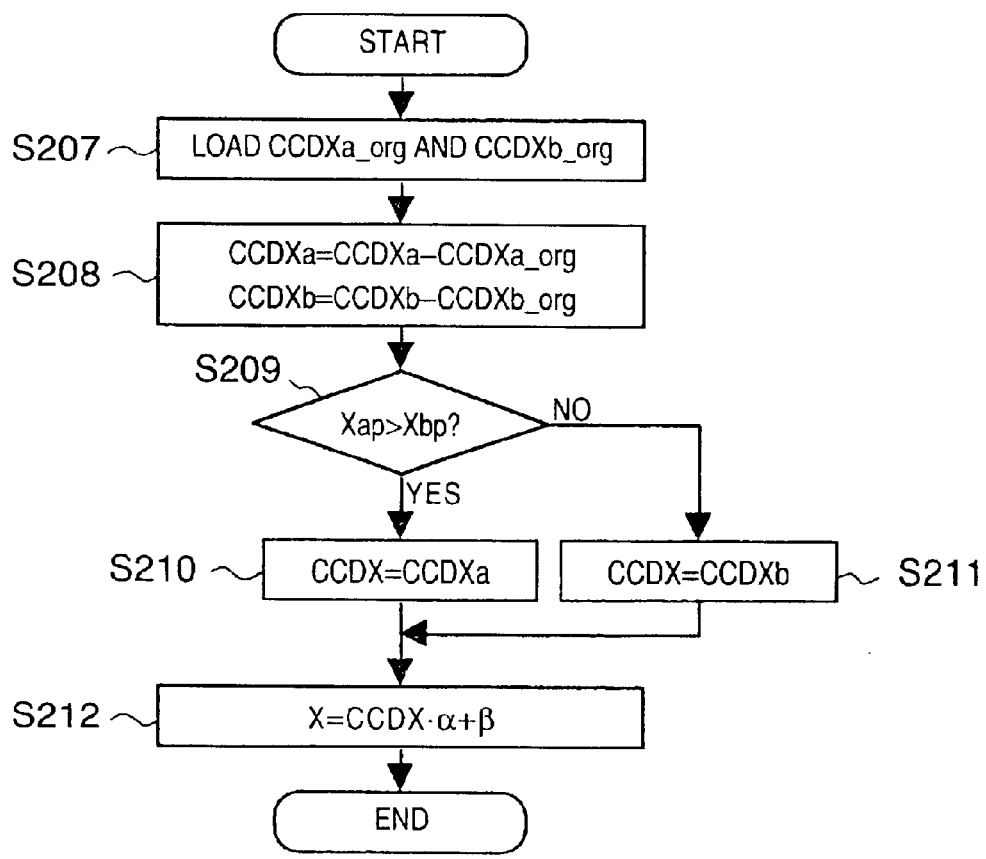
FIG. 17 is a flow chart showing the processing flow of a process for computing a coupled coordinate CCDX of the embodiment shown in FIG. 1.

FIG. 17 is a flow chart showing the processing flow of the process for computing the coupled coordinate CCDX of this embodiment.

In step S207, the reference point data (CCDXa_org and CCDXb_org) of the linear CCDs 26 of the linear sensors 20Xa and 20Xb are loaded from the memory. In step S208, the differences between values CCDXa and CCDXb computed upon input from the pointing tool 4 and the reference point data are computed. In this way, the coordinate values are converted into those on a linear CCD which has a point on a line L1 near the center of FIG. 16 as an origin.

In step S209, previously stored peak levels XaP and XbP of the linear sensors 20Xa and 20Xb are compared. Normally, since a signal produced by, e.g., disturbance light is considerably smaller than a signal produced by a regular beam spot, a larger peak value is selected as a regular coordinate. In this manner, the coordinate values of the two linear CCDs 26 of the linear sensors 20Xa and 20Xb can be coupled to have L1 as a boundary.

More specifically, if the peak level XaP is larger than the peak level XbP (YES in step S209), the flow advances to step S210 to set CCDX=CCDXa, and the flow advances to step S212. On the other hand, if the peak level XaP is smaller than XbP (NO in step S209), the flow advances to step S211 to set CCDX=CCDXb, and the flow advances to step S212.

In step S212, CCDX obtained by the above process is converted into a coordinate value X on the screen 10. Conversion of the coordinate value X is done using a magnification $\alpha$ and offset $\beta$, which are measured in advance and are stored in, e.g., a nonvolatile memory or the like, by:

$$X = CCDX \cdot \alpha + \beta$$

Note that the magnification $\alpha$ and offset $\beta$ can be converted from the coordinate values CCDX and coordinate values on the screen 10 obtained by making input operations at a plurality of known points in advance in the same manner as the reference point data.

The processes for the X-coordinate have been explained, and the same processes are done for the Y-coordinate.

As described above, when the coordinate value is computed using a plurality of linear CCDs 26 (i.e., those of the linear sensors 20Xa and 20Xb), the linear CCDs are placed to have an overlapping portion, and a reference coordinate (reference point data) point is set in that portion, thus handling these linear CCDs as a single linear CCD. Also, since variations upon attachment can also be absorbed, coordinate input on a larger region is implemented without decreasing the resolving power or the like.

Data signals indicating the coordinate values (X, Y) computed by the aforementioned computation process are sent from the coordinate computation unit 32 to the communication controller 33. The communication controller 33 receives the data signals, and a control signal from the control signal detector 72. These data signals and control signal are converted into communication signals in a predetermined format, and the converted signals are sent to an external display control device. In this manner, various operations such as cursor movement, menu selection, input of a character/line image, and the like on the screen 10 can be made.

When the linear sensors are constructed as area sensors to double the resolving power, the number of pixels and computation data four times the original arrangement are required, while when they are constructed as linear sensors, the number of pixels and computation data need only be doubled in the X- and Y-coordinate directions. Hence, it is easy to increase the number of pixels to attain higher resolving powers.

As described above, according to this embodiment, signals obtained at the emission and non-emission timings of the beam spot which flickers at a predetermined period by the pointing tool are individually integrated, and a differential signal between these signals is computed. In this manner, a pixel position corresponding to the peak level can be precisely computed. Also, the plurality of linear CCDs are laid out so that their detection regions overlap each other, and a reference coordinate point is set within the overlapping region, thus realizing a compact, lightweight, and low-cost device which can obtain a coordinate value with high precision and high resolving power, and can suppress the influence of disturbance light.

In the above embodiment, two linear sensors are used to compute a coordinate value in each of the X- and Y-coordinate directions. However, the present invention is not limited to such specific arrangement. When the number of linear sensors is increased to cope with a more giant area, the present invention can be applied by assuring an overlapping portion between neighboring linear sensors, and setting a reference point in that overlapping portion. Hence, the number of linear sensors is not limited to that in the above embodiment.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the flow charts shown in FIGS. 15 and 17 mentioned above.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input device for generating a coordinate value corresponding to light coming from a pointing tool, comprising:

optical means for imaging the light;

a plurality of sensing means, arranged for one coordinate axis, for sensing the light imaged by said optical means, wherein light-receiving areas of said plurality of sensing means have an overlapping portion;

measurement means for measuring peak levels of data sensed by said plurality of sensing means arranged for the one coordinate axis;

comparison means for comparing the peak levels measured by said measurement means;

selection means for selecting one of said plurality of sensing means arranged for the one coordinate axis on the basis of a comparison result of said comparison means; and output means for outputting a coordinate value corresponding to the light on the basis of the sensing means selected by said selection means.

2. The device according to claim 1, wherein each of said plurality of sensing means has a linear array of a plurality of photoelectric conversion elements.

3. The device according to claim 2, wherein said output means comprises computation means for computing the coordinate value corresponding to the light at a resolving power not less than the number of pixels corresponding to said plurality of photoelectric conversion elements.

4. The device according to claim 1, wherein said output means comprises storage means for storing a reference coordinate value in the overlapping portion, and said output means outputs the coordinate value corresponding to the light using the reference coordinate value.

5. The device according to claim 1, wherein the overlapping portion is defined by light-receiving areas of neighboring ones of said plurality of sensing means.

6. A method of controlling a coordinate input device for generating a coordinate value corresponding to light coming from a pointing tool, comprising the steps of:

measuring peak levels of data detected by a plurality of sensors, which are arranged for one coordinate axis and adapted to sense the light imaged by an optical means, wherein light-receiving areas of the plurality of sensors have an overlapping portion;

comparing the peak levels measured in the measurement step;

selecting one of the plurality of sensors arranged for the one coordinate axis on the basis of a comparison result in the comparison step; and outputting a coordinate value corresponding to the light on the basis of the sensor selected in the selection step.

7. The method according to claim 6, wherein each of the plurality of sensors has a linear array of a plurality of photoelectric conversion elements.

8. The method according to claim 7, wherein the output step computes the coordinate value corresponding to the light at a resolving power not less than the number of pixels corresponding to the plurality of photoelectric conversion elements.

9. The method according to claim 6, wherein the output step stores a reference coordinate value in the overlapping portion in a storage medium, and the output step outputs the coordinate value corresponding to the light using the reference coordinate value.

10. The method according to claim 6, wherein the overlapping portion is defined by light-receiving areas of neighboring ones of the plurality of sensors.

11. A computer readable memory which stores a program code of controlling a coordinate input device for generating a coordinate value corresponding to light coming from a pointing tool, comprising:

a program code of a measurement step of measuring peak levels of data detected by a plurality of sensors, which are arranged for one coordinate axis and adapted to sense the light imaged by an optical means, wherein the light-receiving areas of the plurality of sensors have an overlapping portion;

a program code of a comparison step of comparing the peak levels measured in the measurement step;

a program code of a selection step of selecting one of the plurality of sensors arranged for the one coordinate axis on the basis of a comparison result in the comparison step; and a program code of an output step of outputting a coordinate value corresponding to the light on the basis of the sensor selected in the selection step.

* * * * *

UNITED STATES PATENT AND TRADEMARK OFFICE
CERTIFICATE OF CORRECTION

| | | |
|---|---|---|
| PATENT NO. | : 6,906,702 B1 | |
| APPLICATION NO. | : 09/526463 | |
| DATED | : June 14, 2005 | |
| INVENTOR(S) | : Atsushi Tanaka et al. | |

It is certified that error appears in the above-identified patent and that said Letters Patent is hereby corrected as shown below:

[30]   FOREIGN APPLICATION PRIORITY DATA:

"11-076862" should read --11-076861--.

[56] REFERENCES CITED:

U.S. PATENT DOCUMENTS, "5/2001   Hasegawa" should read
--8/2001   Hasegawa--.

SHEET 5:

FIG. 5, "CALPUTATION" should read --COMPUTATION--.

SHEET 9:

FIG. 9, "PEAL" should read --PEAK--.

COLUMN 1:

Line 32, "U.S. Patent No. 2,503,182" should read --Japanese Patent No. 2503182--.

COLUMN 2:

Line 45, "sensor," should read --sensors,--.

UNITED STATES PATENT AND TRADEMARK OFFICE
CERTIFICATE OF CORRECTION

PATENT NO. : 6,906,702 B1
APPLICATION NO. : 09/526463
DATED : June 14, 2005
INVENTOR(S) : Atsushi Tanaka et al.

It is certified that error appears in the above-identified patent and that said Letters Patent is hereby corrected as shown below:

<u>COLUMN 3:</u>

Line 38, "explaining" should read --explaining the--.

<u>COLUMN 4:</u>

Line 66, "sate," should read --state,--.

Signed and Sealed this

Eighteenth Day of July, 2006

JON W. DUDAS
*Director of the United States Patent and Trademark Office*